No. 871,644. PATENTED NOV. 19, 1907.
E. W. SMITH.
LOAF FORMING MACHINE.
APPLICATION FILED MAR. 1, 1907.
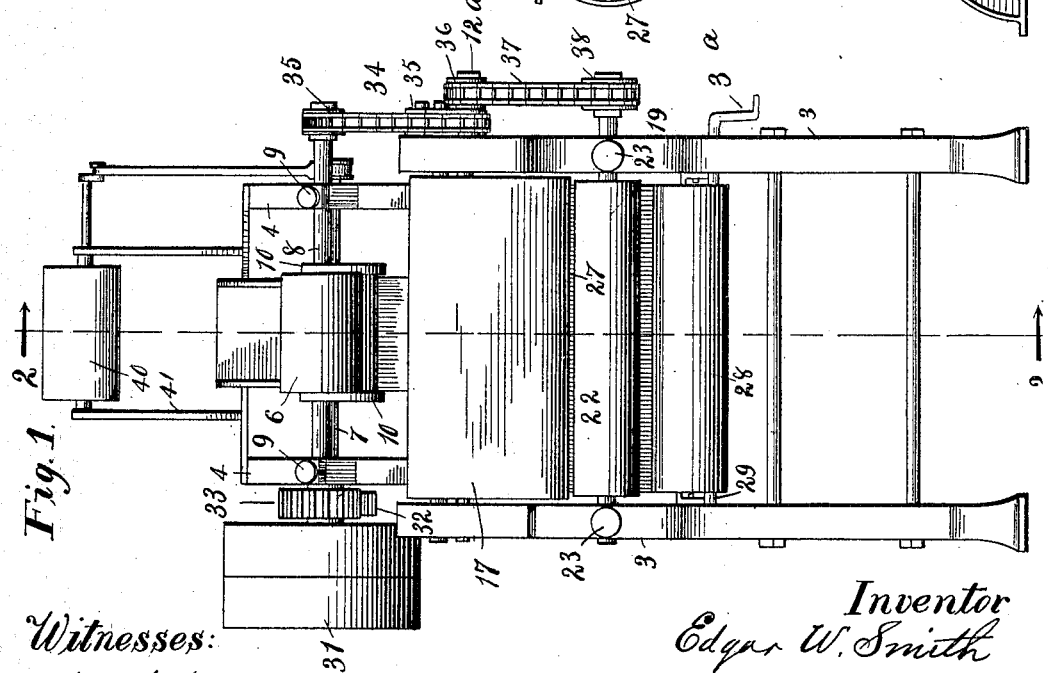
Witnesses:
Chas. F. Bassett
Mathew J. Marty
Inventor
Edgar W. Smith
By Frederick Benjamin
Atty.

UNITED STATES PATENT OFFICE.

EDGAR W. SMITH, OF JOLIET, ILLINOIS, ASSIGNOR TO CHAMPION MACHINERY COMPANY, OF JOLIET, ILLINOIS, A CORPORATION OF ILLINOIS.

LOAF-FORMING MACHINE.

No. 871,644.　　　　　Specification of Letters Patent.　　　　　Patented Nov. 19, 1907.

Application filed March 1, 1907. Serial No. 359,989.

*To all whom it may concern:*

Be it known that I, EDGAR W. SMITH, a citizen of the United States, residing at Joliet, in the county of Will and State of Illinois, have invented certain new and useful Improvements in Loaf-Forming Machines, of which the following is a specification.

My invention relates to baker's machinery and more especially to dough handling apparatus having the function of shaping and molding the dough after it has been prepared and divided into lumps or pieces.

The chief objects of my invention are to produce a simple, efficient and easily operated machine for the purpose stated and to that end I have devised the appliance illustrated in the accompanying drawing which forms a part of this specification and which consists, essentially, of a receiving hopper into which the divided portions of dough are severally deposited to be acted upon by a series of compressing or sheeting rollers placed beneath the hopper to form each loaf mass into an elongated strip which falls by gravity upon revolving surfaces having a tendency to roll or wind the strip of dough upon itself until it assumes a cylindrical form, thence dropping upon an endless apron to be carried a considerable distance between moving and fixed surfaces, thus continuing the rolling and kneading process, shaping the loaves uniformly, and having adjusting means to vary the pressure upon the dough cylinder to change the dimensions of the finished product, when desired.

In the drawing: Figure 1 is a front elevation of my improved 'dough molding machine, and Fig. 2 is a sectional view taken on the line 2—2 of Fig. 1.

Referring to the drawing in detail the numeral 3 indicates the main frame of the machine which supports an auxiliary frame 4 carrying a pair of rollers 5, 6, mounted on shafts 7 and 8, respectively. These shafts are journaled in the auxiliary frame 4, and the bearings of the said shaft 8 are adjustable by the hand wheels 9, thus allowing a variation in the space between the opposite faces of the rollers. The said rollers have approximately the same cross diameter, and the rear roller 5 is provided with flanges 10 which overlap the ends of the companion roller 6 to confine the dough laterally as it passes between the rollers.

A short distance below the rear roller 5 is mounted a comparatively small roll 11, and directly beneath this is a larger roll 12 both rolls being carried on a shaft $12^a$ mounted in fixed bearings in the auxiliary frame 4 so that their surfaces just clear. In front of the last mentioned rolls, is located a roller 13 mounted on a shaft 14 journaled in the main frame and connected to an idler roller 15 carried on a shaft 16 by an endless apron or belt 17 made of felt or similar material having a surface covered with a pile or nap. Below, and a little in front of the said idler 15, is a similar roller 18 having its shaft 19 journaled in the main frame and at the rear of the frame is a corresponding idler 20 carried on a shaft 21 similarly journaled. The said roller 18 and idler 20 are connected by an endless apron 22 of material similar to the previously mentioned apron 17. The bearings of the roller 18 are adjustable by means of the hand wheel 23, to keep the said apron 22 at a proper tension to prevent undue sagging and to have it run true. Between the said rollers 5 and 11 is located a scraper 24 which is closed adjusted to the surfaces of the adjacent rollers and serves to remove any fragments of dough which may adhere to their surfaces.

Below the roller 12 is fixed a guide plate 25, its horizontal portion being approximately parallel with the apron 22, and beneath said apron is located a compressing plate 26 having its rear end 27 upturned and curved on an arc approximately concentric with the axis of the idler 20, while its front margin is depressed to form a channel or trough into which the cylinders of dough are rolled by the action of the endless apron 22. Transverse rods 29 are arranged beneath this plate and carry cams 30 which serve to adjust said plate 26 vertically when operated by a handle $30^a$.

Upon the extremity of the shaft 7 of the sheeting roller 5 are mounted tight and loose driving pulleys 31 and motion is communicated to the companion shaft 8 by a pinion 32 which gears with a similar pinion 33 keyed on said shaft 8. From the other end of the latter a single sprocket chain 34 imparts motion to the rollers 11, 12, and 13, by means of sprocket wheels 35 mounted on the shafts of said rollers. It will be seen that this arrangement of the gearing will cause the rolls 6, 11, 12, and 13, to revolve in the same direction as indicated by the arrows in Fig. 2.

Upon the outer end of the shaft 12ª which carries the roll 12 is carried a sprocket 36 which connects by a chain 37 with a sprocket 38 mounted on the shaft 19 of the roller 18. Above the rollers 5 and 6 is placed a receiving hopper 39, and standards 41 secured to the auxiliary frame 4 carry the usual flour dredge 40.

The operation of the machine is as follows: The divided portions of dough are placed singly in the hopper 39 where the rolls 5 and 6 immediately size upon the piece and as these rolls turn towards each other the dough will be compressed and drawn through the rolls in a sheet, as indicated by the dotted lines A in Fig. 2. As soon as the lower end of this sheet or strip reaches the face of the roller 12 its margin is curled upward and forward by the roller movement as fast as the material is fed, the small roll 11 assisting in this involution of the sheet margin. The rolled sheet then falls between the roll 12 and the apron 17 upon the horizontally moving apron 22, the downward movement of the rear face of the said apron 17 facilitating the descent of the cylinder of dough and continuing its rotation in the same direction as the primary movement. The apron 22 then carries the dough cylinder beneath the fixed plate 25 and onward toward the rear, sufficient pressure being maintained between the opposing surfaces to continue the kneading process and preventing any tendency of the layers of the dough cylinder to unwind. The dough mass indicated by $a^1$ is thus rolled along until it is carried around between the rear end of the apron 22 and the curved portion 27 of the adjustable pressure plate 26 and this movement is continued between the under side of the said apron and the horizontal portion of the plate 26, a certain amount of pressure being exerted by the adjustment of the cams 30. By the time the dough has thus reached the pan 28 and has been deposited therein as shown at $a^3$ the kneading and shaping process will have been completed in a thorough manner, and the seam or joint between the end of the sheet and the adjacent layer will be effectually closed.

Having thus described my invention, I claim:—

1. In a dough-molding machine, a pair of feed rollers arranged to compress a lump of dough, a pair of involuting rolls arranged to receive the dough from the feed rollers, a movable guiding apron of napped material arranged opposite said involuting rolls, an endless conveyer traveling in a plane at right angles to said guiding apron, and a fixed compression plate co-acting with said endless conveyer.

2. In a dough-molding machine, a pair of feed rollers arranged to compress a lump of dough, a pair of involuting rolls arranged to receive the dough from the feed rollers, and revolving in the same direction, a vertically disposed guiding apron of napped material arranged opposite said involuting rolls, an endless conveyer traveling in a horizontal plane, a fixed compression plate, and an adjustable compression plate, arranged on opposite sides of said conveyer, substantially as described.

In testimony whereof I affix my signature in presence of two witnesses.

EDGAR W. SMITH.

Witnesses:
   JNO. A. DAVILLA,
   THOMAS G. KING.